(12) United States Patent
Asano et al.

(10) Patent No.: US 7,412,606 B2
(45) Date of Patent: *Aug. 12, 2008

(54) COPY PROTECTION USING DETAILED COPY CONTROL INFORMATION

(75) Inventors: Tomoyuki Asano, Kanagawa (JP); Yoshitomo Osawa, Kanagawa (JP); Teruyoshi Komuro, Kanagawa (JP); Ichiro Hamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/224,790

(22) Filed: Sep. 13, 2005

(65) Prior Publication Data

US 2006/0020829 A1    Jan. 26, 2006

Related U.S. Application Data (63) Continuation of application No. 09/719,708, filed on Dec. 15, 2000, now Pat. No. 6,978,377.

(51) Int. Cl.
*G06F 12/14*    (2006.01)
*H04L 9/00*    (2006.01)
*H04K 1/00*    (2006.01)
*H04N 7/167*    (2006.01)

(52) U.S. Cl. .................. 713/193; 713/165; 713/166; 713/194; 726/26; 726/31; 726/32; 726/33; 380/201; 380/203; 380/231; 380/237; 705/51; 705/52; 705/57

(58) Field of Classification Search .................. 713/193
See application file for complete search history.

(56) References Cited

U.S. PATENT DOCUMENTS 5,673,357 A    9/1997    Shima .................. 386/94
5,889,919 A    3/1999    Inoue et al. .................. 386/94
5,987,126 A *  11/1999    Okuyama et al. .......... 380/203

(Continued)

FOREIGN PATENT DOCUMENTS

EP    0598671 A2    5/1994

(Continued)

OTHER PUBLICATIONS

Engel et al, Format-Compliant JPEG2000 Encryption with Combined Packet Header and Packet Body Protection, 2007, ACM, pp. 87-95.*

(Continued)

*Primary Examiner*—Ayaz Sheikh
*Assistant Examiner*—Aravind K Moorthy
(74) *Attorney, Agent, or Firm*—Finnegan, Henderson, Farabow, Garrett & Dunner, L.L.P.

(57) ABSTRACT

Based on the detailed reproduction control information defining the reproduction control state of data to be transmitted, the CPU 12 of the data transmission apparatus creates a simplified reproduction control information roughly defining the reproduction control state of the data, stores the simplified reproduction control information of the data in the packet header of a data packet carrying the data, stores the detailed reproduction control information in the data, and transmits the simplified reproduction control information and the detailed reproduction control information as well as the data to the data receiving apparatus 20 through the transmission channel 30 from the input-output interface 16. The CPU 22 of the data receiving apparatus 20 analyses the reproduction control state of the data contained in the data packet based on the simplified reproduction information and the detailed reproduction information contained in the data packet, and controls the reproduction of the data by the action of the media access part 26 according to the analysis result.

12 Claims, 6 Drawing Sheets

U.S. PATENT DOCUMENTS

| | | | | |
|---|---|---|---|---|
| 6,131,161 | A | 10/2000 | Linnartz | 713/176 |
| 6,209,092 | B1 | 3/2001 | Linnartz | 713/176 |
| 6,298,355 | B1 | 10/2001 | Tanaka et al. | 707/200 |
| 6,317,744 | B1 | 11/2001 | Elko et al. | 707/10 |
| 6,438,319 | B1 * | 8/2002 | Inoue et al. | 386/116 |
| 6,453,304 | B1 * | 9/2002 | Manabu et al. | 705/57 |
| 6,473,560 | B1 | 10/2002 | Linnartz et al. | 386/94 |
| 6,526,144 | B2 * | 2/2003 | Markandey et al. | 380/28 |
| 6,546,414 | B1 | 4/2003 | Dahlen et al. | 709/201 |
| 6,574,349 | B1 | 6/2003 | Linnartz et al. | 382/100 |
| 6,584,275 | B1 | 6/2003 | Blatter | 386/94 |
| 6,584,552 | B1 | 6/2003 | Kuno et al. | 711/163 |
| 6,594,667 | B2 | 7/2003 | Dahlen et al. | 707/101 |
| 6,609,214 | B1 | 8/2003 | Dahlen et al. | 714/5 |
| 6,647,202 | B1 | 11/2003 | Yamaguchi et al. | 386/68 |
| 6,668,324 | B1 | 12/2003 | Mangold et al. | 713/189 |
| 6,748,485 | B1 | 6/2004 | Yokota et al. | 711/112 |
| 6,788,604 | B2 | 9/2004 | Yokota et al. | 365/218 |
| 6,850,696 | B1 | 2/2005 | Van Gestel | 386/95 |
| 6,978,377 | B1 * | 12/2005 | Asano et al. | 713/193 |
| 2002/0016922 | A1 * | 2/2002 | Richards et al. | 713/200 |
| 2002/0126984 | A1 * | 9/2002 | Hisatomi et al. | 386/46 |
| 2003/0050919 | A1 * | 3/2003 | Brown et al. | 707/2 |

FOREIGN PATENT DOCUMENTS

| | | |
|---|---|---|
| EP | 0 860 823 | 8/1998 |
| EP | 0 959 467 | 11/1999 |
| EP | 1005044 A2 | 5/2000 |
| EP | 1235220 A2 | 8/2002 |
| EP | 1693666 A1 * | 8/2006 |
| JP | 10-79174 | 3/1998 |
| JP | 11 86437 | 3/1999 |
| JP | 11-353795 | 12/1999 |

OTHER PUBLICATIONS

Shi et al, Attacks and Risk Analysis for Hardware Supported Software Copy Protection Systems, 2004, ACM, pp. 54-62.*

Ton Kalker, System issues in digital image and video watermarking for copy protection, 1999, IEEE, pates 562-567.*

Linnartz et al, System aspects of copy management for digital video, 2000, IEEE, pp. 203-206.*

Patent abstracts of Japan vol. 1999, No. 08, Jun. 30, 1999 & JP 11 086437 A (Toshiba Corp.) Mar. 30, 1999.

Yoshida, Junko, Digital World Divided on watermark specs, 1998, Electronic Engineering Times, pp. 1-2.

Morito, et al., Digital Copy Protection Scheme Using Recording Medium Identifier, 1999, IEEE, pp. 174-178.

Yafei, et al., Research of Watermarking in Digital Video Broadcasting, 2002, IEEE, pp. 604-607.

Barni, et al., Data Hiding for Fighting in Piracy, 2004, IEEE Signal Processing Magazine, pp. 28-39.

* cited by examiner

| COPY RIGHT MODE | COPY RIGHT | ORIGINAL /COPY | MD-EMI SELECTION | REPRODUCTION CONTROL STATE |
|---|---|---|---|---|
| 1 | 1 | × | × | NO COPY RESTRICTION |
| 1 | 0 | 0 | × | COPY ALLOWED UPTO TWO GENERATIONS |
| 1 | 0 | 1 | × | COPY ALLOWED ONLY FOR ONE GENERATION |
| 0 | 1 | × | × | NO COPY RESTRICTION |
| 0 | 0 | 0 | × | COPY ALLOWED ONLY FOR ONE GENERATION |
| 0 | 0 | 1 | 1 | NO MORE COPY ALLOWED |
| 0 | 0 | 1 | 0 | COPY INHIBITED ORIGINALLY |

FIG.3

| FDF field length | | audio_data_type_1 | | | |
|---|---|---|---|---|---|
| audio_data_type_2 | copyright | original or copy | stereo mono | emphasis | |
| data_start indicator | data_end indicator | PES_data_counter | copy_right _mode | MD_EMI_ selection | reserved |
| present_PES_number | | | | | |
| RESERVED | | | | | |
| MUSIC DATA CHECKSUM | | | | | |
| MUSIC DATA (159 BYTES) | | | | | |

FIG.4

| COPY RIGHT MODE | DETAIL REPRODUCTION CONTROL INFORMATION | | | SIMPLE REPRODUCTION CONTROL INFORMATION | REPRODUCTION CONTROL STATE OF DATA ON TRANSMISSION CHANNEL | REPRODUCTION CONTROL STATE OF DATA RECORDED |
|---|---|---|---|---|---|---|
| | COPY RIGHT | ORIGINAL /COPY | MD-EMI SELECTION | | | |
| 1 | 1 | × | × | 0 0 | NO COPY RESTRICTION | NO COPY RESTRICTION |
| 1 | 0 | 0 | × | 1 0 | COPY ALLOWED UPTO TWO GENERATIONS | COPY ALLOWED ONLY FOR ONE GENERATION |
| 1 | 0 | 1 | × | 1 0 | COPY ALLOWED ONLY FOR ONE GENERATION | NO MORE COPY ALLOWED |
| 0 | 1 | × | × | 0 0 | NO COPY RESTRICTION | NO COPY RESTRICTION |
| 0 | 0 | 0 | × | 1 0 | COPY ALLOWED ONLY FOR ONE GENERATION | NO MORE COPY ALLOWED |
| 0 | 0 | 1 | 1 | 0 1 | NO MORE COPY ALLOWED | |
| 0 | 0 | 1 | 0 | 1 1 | COPY INHIBITED ORIGINALLY | |

FIG.5

| SIMPLE REPRODUCTION CONTROL INFORMATION | REPRODUCTION CONTROL STATE OF DATA ON TRANSMISSION CHANNEL | REPRODUCTION CONTROL STATE OF DATA RECORDED |
|---|---|---|
| 0 0 | NO COPY RESTRICTION | NO COPY RESTRICTION |
| 1 0 | COPY ALLOWED ONLY FOR ONE GENERATION | NO MORE COPY ALLOWED |
| 0 1 | NO MORE COPY ALLOWED | |
| 1 1 | COPY INHIBITED ORIGINALLY | |

FIG.6

COPY PROTECTION USING DETAILED COPY CONTROL INFORMATION

This application is a Continuation of U.S. application Ser. No. 09/719,708, filed Dec. 15, 2000, now U.S. Pat. No. 6,978,377 which is hereby incorporated by reference in its entirety herein.

TECHNICAL FIELD

This invention relates to a data processing system, a data processing method and a data processing apparatus.

BACKGROUND ART

In recent years, a system of transmitting and recording such digital data as music information and image information by connecting a plurality of AV equipment through a digital filter for example at home has been gaining ground. For example, video camera, Digital Versatile Disk (DVD) (trade mark) and other AV equipment with an interface according to the IEEE (The International of Electrical and Electronics Engineers, Inc.) 1394 high-performance serial bus standard (hereinafter referred simply as the IEEE 1394 serial bus) which is a digital bus are being developed.

Normally, movie data are copyright information, which requires some measures to prevent any unauthorized users from copying.

In order to prevent any copy by unauthorized users, for example, in the Minidisk (MD) (trade mark) system, a method called "SCMS (Serial Management System)" is used. This means information transmitted via a digital interface along with music information. This information indicates that the music data are either "copy free," "copy once allowed" or "copy prohibited" data. On receiving music data from the digital interface, a minidisk recorder detects SCMS and if the data are copy prohibited, the music data are not recorded in a minidisk, and in case of copy once allowed data, the SCMS information is converted into copy-prohibited data and is recorded along with the music data received. In the case of copy-free data, the SCMS information is recorded as it is along with the music data received.

In this way, the minidisk system uses SCMS to prevent any unlawful copy of copyright data.

And in a data transmission system in which a digital interface is used to transmit or record music data, image data and other digital data, a method of storing reproduction control information in the packet header of each data packet on the transmission channel for transmission has been devised.

Such reproduction control information is defined by two bits for example as follows:

00: Copy free;
10: Copy once allowed;
01: No more copy allowed;
11: Originally copy prohibited.

On receiving a data packet, the recording equipment records the data and examines the reproduction control information. When the reproduction control information is either "01" or "11" representing the prohibition of copy, the data received are not recorded. And when the reproduction control information is "10" representing copy allowed only once, the reproduction control information is converted into "01" representing no more copy allowed and then the data received are recorded in the recording media.

In this way, the copy generation resulting from the original data is confined.

Further, in order to give the confining method of copy generation a coercive power, a method in which data are enciphered for transmission and the information required for enciphering and deciphering is licensed only to those suppliers who have entered an agreement to manufacture solely the equipment fully complying with the copy generation confinement system is also used.

Incidentally, the method of storing the reproduction control information in the packet header of data packets on the transmission channel for transmission leaves the possibility of the reproduction control information being changed by other apparatuses in the process of transmission of packets from a transmitting apparatus to a receiving apparatus.

Figure 6:
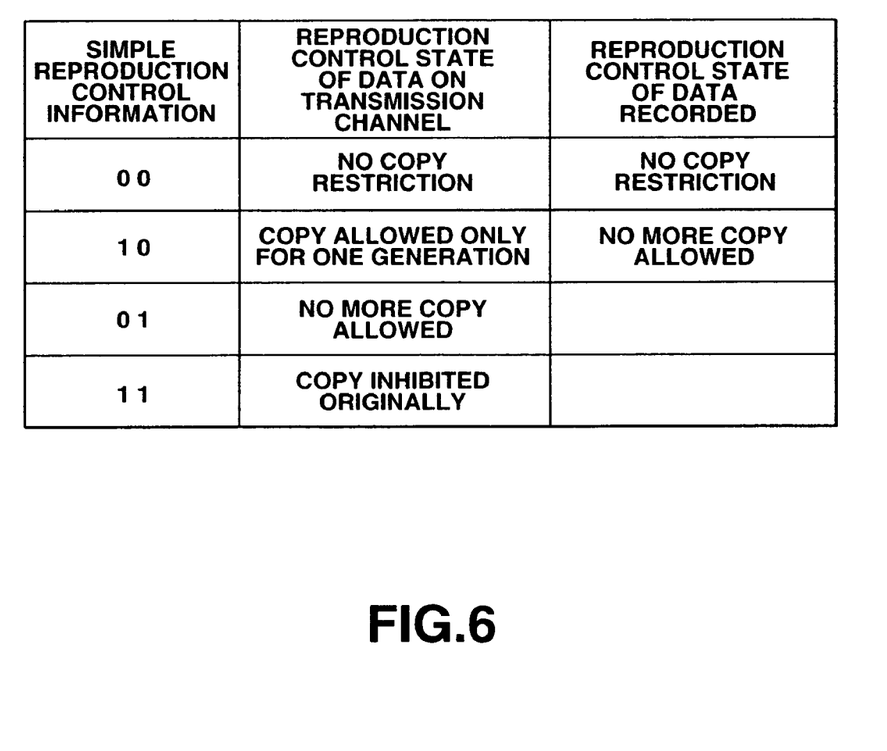
FIG. 6 is a drawing showing the reproduction controlled state of data defined only by simplified reproduction control information contained in a data packet received by the data receiving apparatus side in the data transmission system.

For example, as shown in FIG. 6, even if the transmitting apparatus 1 transmits "11" meaning copy prohibited for the reproduction control information contained in the packet header of data packets, when the reproduction control information meets a changing attack during its transmission and the reproduction control information changes into "10" indicating copy once allowed, the data receiving apparatus 2 having received the packet cannot detect that this data is originally copy prohibited, and records the data as the reproduction control information contained in the packet header allows a one-time recording.

Thus, the traditional data transmission method is likely to become unable to control copy generation.

By the way, such two-bit information as mentioned above can represent only four types of reproduction control information. Depending on type of service, copy is allowed for up to two generations in addition to the four types mentioned above requiring to indicate a wider variety of reproduction control information, which in turn requires to use a larger number of bits.

However, the system of storing reproduction control information in the header of transmission packets for transmission leaves only a limited reserved area in the header making it difficult to store many bits there.

There is another method of storing reproduction control information not in the packet header but within the data. In this case, the difference of position and meaning of the reproduction control information by data format requires that the receiving apparatus to search for the reproduction control information for each format and to interpret the meaning thereof.

DISCLOSURE OF THE INVENTION

In view of such past problems, it is the object of the present invention to provide a data processing system, a data processing method and a data processing apparatus capable of showing a variety of reproduction control states that cannot be shown solely by reproduction control information storable in the packet header and of protecting effectively copyright in a meticulously thought-out manner.

The data processing system according to the present invention includes the first data processing apparatus having a setting means that sets the first reproduction control information showing the reproduction control state of data and the second reproduction control information showing the reproduction control state of the data set in greater detail than the first reproduction control information and an output means that outputs the first reproduction control information, the second reproduction control information and the data; and the second data processing apparatus having an input means that inputs the first reproduction control information showing the reproduction control state of data and the second reproduction control information showing the reproduction control state of the data set in greater detail than the first reproduction control information and the data and a controlling means of reproduction that determines the reproduction control state of the data based on the first reproduction control information and second reproduction control information inputted by the input means and controls the reproduction of the data according to the determination result.

In one respect, the data processing method according to the present invention includes the steps of creating the second reproduction control information defining more roughly the reproduction control state than the first reproduction control information based on the first reproduction control information defining the reproduction control state of data to be transmitted, storing the second reproduction control information of the data in the packet header of the data packet carrying the data and storing the first reproduction control information in the data, and transmitting simultaneously the first reproduction control information and second reproduction control information as well as the data.

In another respect, the data processing apparatus according to the present invention includes a setting means that sets the first reproduction control information showing the reproduction control state of data and the second reproduction control information showing the data set in greater detail than the first reproduction control information; and an output means that outputs the first reproduction control information, the second reproduction control means and the data.

In another respect, the data processing apparatus according to the present invention includes an input means that inputs the first reproduction control information showing the reproduction control state of data, the second reproduction control information showing the reproduction control state of the data set in greater detail than the first reproduction control information and the data; and a reproduction control means that determines the reproduction control state of the data based on said first reproduction control information and the second reproduction control information inputted by the input means and controls the reproduction of the data according to the determination result.

In still another respect, the data processing apparatus according to the present invention includes an input means that inputs the first reproduction control information showing the reproduction control state of data, the second reproduction control information defining the reproduction control state of the data in greater detail than said first reproduction control information and the data; and a reproduction control means that determines the reproduction control state of the data based only on the first reproduction control information among the first reproduction control information and the second reproduction control information inputted by the input means and controls and controls the reproduction of the data according to the determination result.

Finally, the information signal according to the present invention includes the first reproduction control information showing the reproduction control state of data; the second reproduction control information showing the reproduction control state of the data set in greater detail than the first reproduction control information; and the data proper.

BEST MODE FOR CARRYING OUT THE INVENTION

The best mode for carrying out the present invention is hereinafter explained with references to the drawings.

Figure 1:
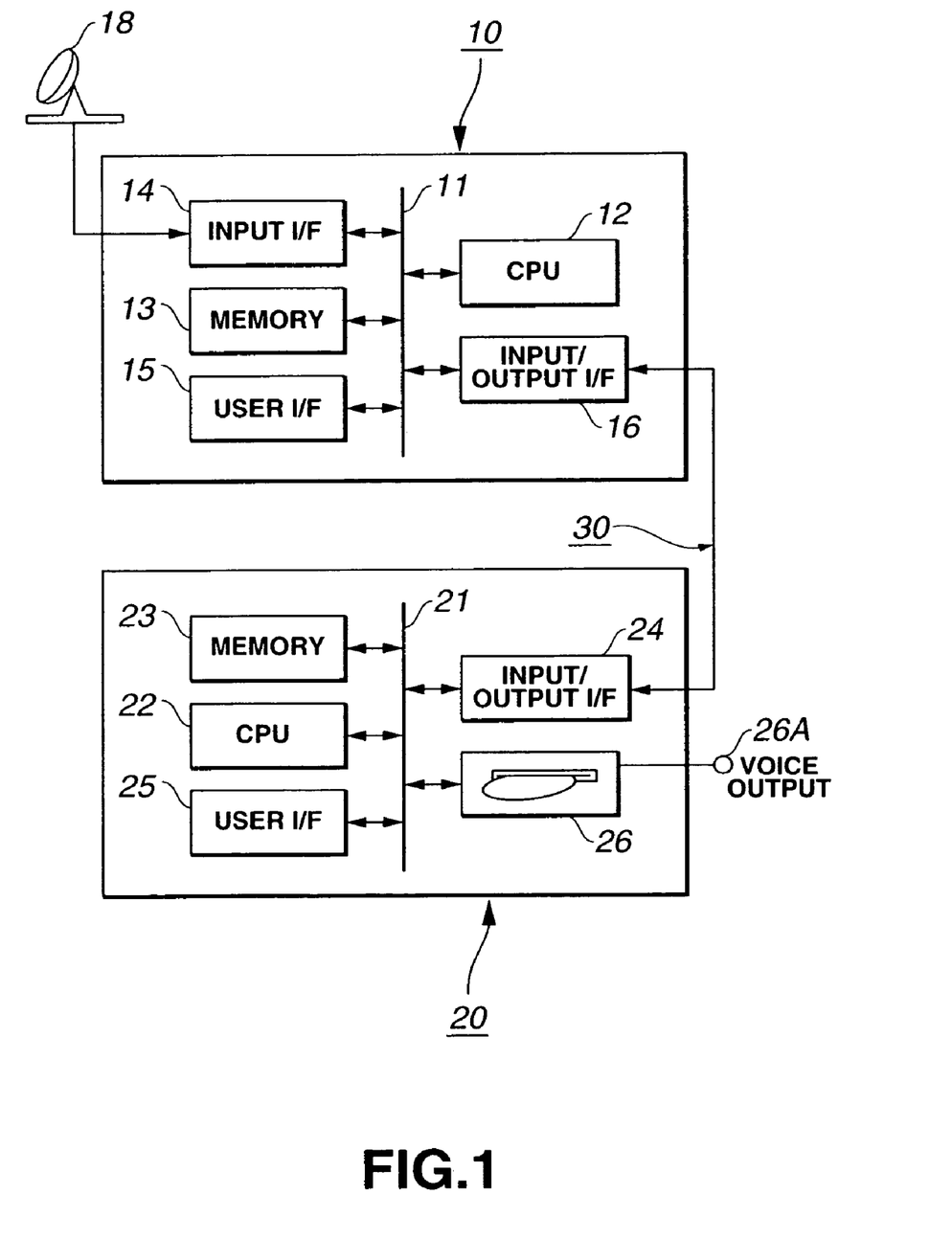
FIG. 1 is a block diagram showing the configuration of a data transmission system according to the present invention.

This invention is applied to a data transmission system as shown for example in FIG. 1.

This transmission system includes a data transmitting apparatus 10 and a data receiving apparatus 20, the data transmitting apparatus 10 and the data receiving apparatus 20 being interlinked through a transmission channel 30.

In the data transmission system of this mode of embodiment, the data transmitting apparatus 10 is a set top box designed to receive satellite digital multichannel broadcast programs coming from communication satellite, and consists of a central processing unit (CPU) 12, a memory 13, an input interface 14, user interface 15, input-output interface 16, etc. The input interface 14 is connected to a satellite antenna 18. And the input-output interface 16 is an IEEE (The International of Electrical and Electronics Engineers, Inc.) 1394 high performance serial bus interface (hereinafter referred to simply as "IEEE 1394 interface") which is a digital interface, and is connected to the transmission channel 30. The transmission channel 30 is a transmission channel consisting of an IEEE 1394 serial bus.

In this data transmission apparatus 10, the CPU 12 operates according to a control program stored in the memory 13 and performs various control operations including the selection of programs according to the operational information inputted by the user interface 15.

And this data transmission apparatus 10 chooses the desired channel of satellite digital multichannel broadcast signals through the input interface 14 to which the receiving antenna 18 is connected and receives image and music data of the desired channel. The image and music data thus received are then transmitted as contents data to the transmission channel 30 through the input-output interface 16.

On the other hand, the data receiving apparatus 20 is a recording apparatus that records data contents received from the data transmitting apparatus 10 or image and music data on a magnetic tape, an optical magnetic disk or other recording media, and consists of a central processing unit (CPU) 22 connected to an internal bus 21, a memory 23, an input-output unit interface 24, an user interface 25, a media access part 26, etc. The input-output interface 24 is an IEEE 1394 interface which is a digital interface, and a transmission channel 30 is connected thereto.

The IEEE1394 standard calls the transmission action performed within a network as "subaction" and sets forth two types of subactions. In other words, these two subactions are defined as an asynchronous transfer mode used for normal data transmission for one of them and the other is a synchronous transfer mode that assures a transmission band called "Isochronous Data Transfer."

In this data transmission system, the isochronous data transfer mode that can secure a transmission band is used to transmit music data between the data transmission apparatus 10 and the data receiving apparatus 20.

Figure 2:
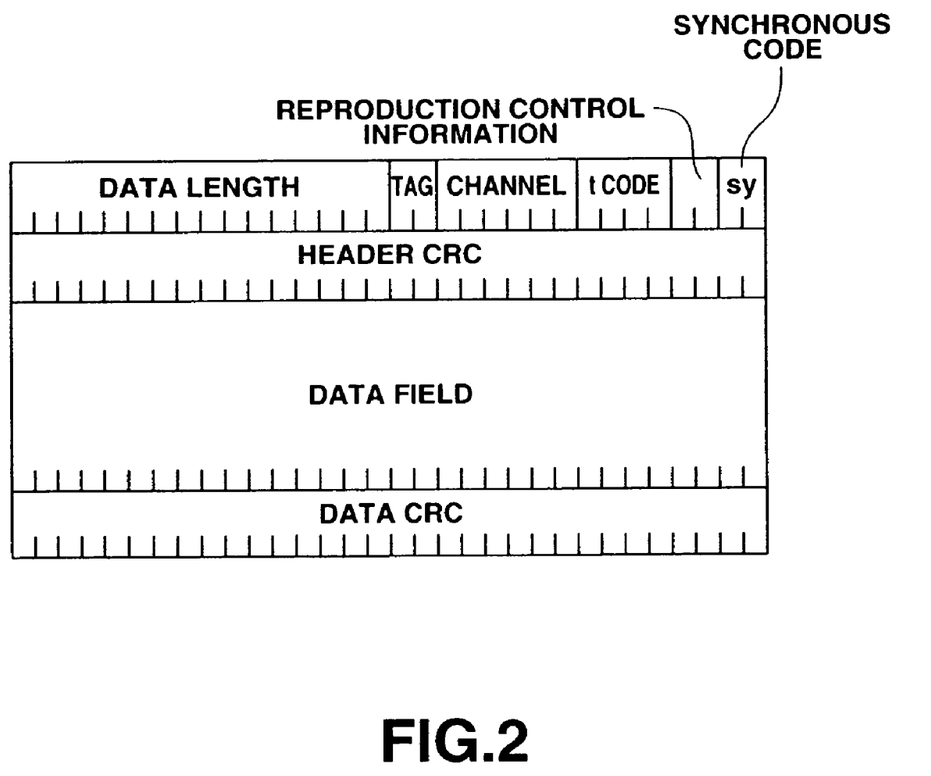
FIG. 2 is a drawing showing the structure of a transmission frame (isochronous packet) transmitted over the IEEE1394 serial bus.

Here, FIG. 2 shows the construction of a packet (isochronous packet) transmitted by the isochronous transfer mode on the transmission channel 30 consisting of an IEEE1394 serial bus.

An isochronous packet consists of a header, a header CRC, a data field and a data CRC as shown in FIG. 2.

The header includes a data length, a tag, a channel, a t code and a synchronization code "sy."

The data length shows the length of data field. The tag shows the format of data transferred by the isochronous packet. The channel is used to identify and to receive a specific desired packet from among a plurality of isochronous packets transmitted on the IEEE 1394 serial bus. t code is a transaction code, and includes a value showing that it is an isochronous transfer. The synchronization code "sy" is used to exchange synchronization information between the transmitting side and the receiving side and to synchronize the image data, voice data and other contents data stored in the data field.

The header CRC is an area for storing CRC (Cyclic Redundancy Code) for data stored in the data field.

The data field is a field where image data, voice data and other contents data are stored.

The data CRC is an area for storing CRC (Cyclic Redundancy Code) for data stored in the data field. This serves as the basis for checking transfer errors of data.

And the data receiving apparatus 20 receives contents data through the input-output interface 24, and if the data are recordable, the apparatus records the same on a recording medium through a media access part 26, converts the contents data into analogue signals and outputs the same from the voice output terminal 26A.

And upon receiving contents data of which recording is prohibited, the data receiving apparatus 20 does not record the same on the recording medium through the action of the media access part 26, simply converts music data into analogue signals and outputs the same from the voice output terminal 26A.

In this data receiving apparatus 20, the CPU 22 operates according to the control program stored in the memory 23, and in response to the operational information inputted through the user interface 25, controls the recording and reproduction actions of the media access part 26 on the recording medium.

The following is an explanation on the case where the contents data are music information. Here, in this data transmission system, the music data are supposed to take one of the following five types of reproduction control mode:

(a) Copy free;
(b) Copy allowed for one more generation;
(c) Copy allowed for two more generations;
(d) No more copy allowed;
(e) Originally copy prohibited.

Upon receiving this music data from a satellite, the data transmission apparatus 10 judges in which of the five types of reproduction control mode (a)~(e) the data are.

Figure 3:
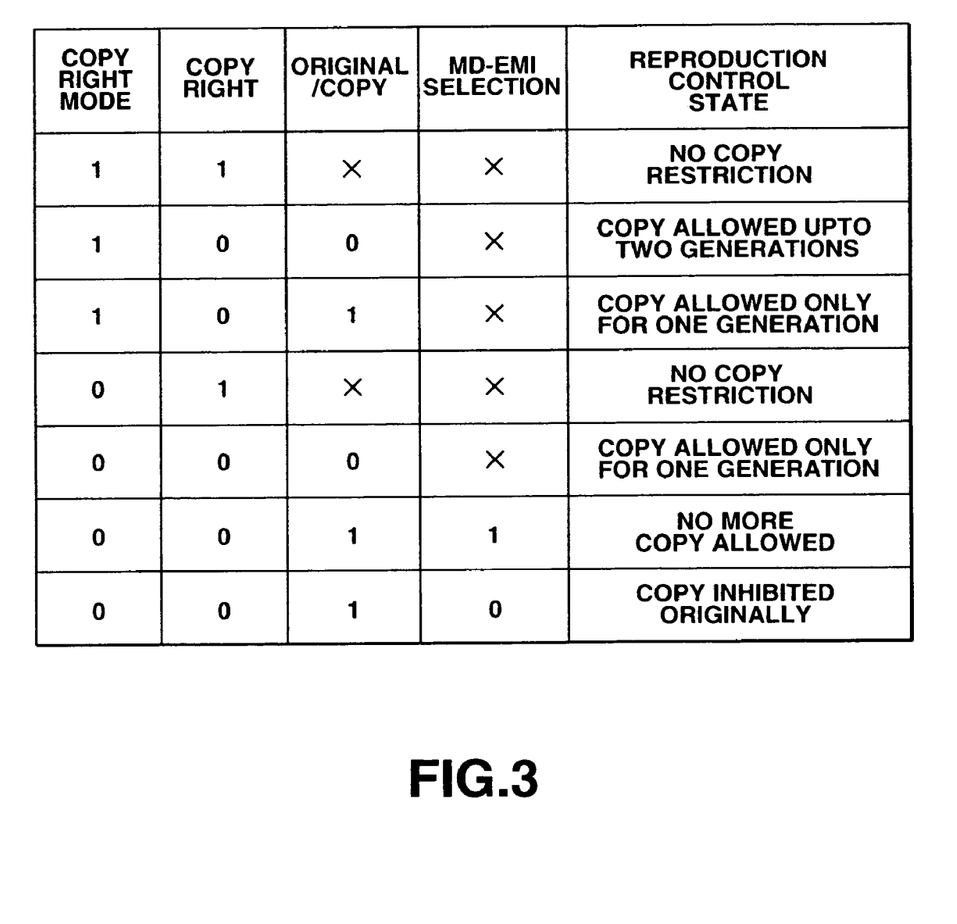
FIG. 3 is a drawing showing the definition contents in reproduction control state of data in detailed reproduction control information in the data transmission system.

This is done by receiving through the satellite the four bits of copyright mode, copyright, original/copy, and MD-EMI selection defined as shown in FIG. 3 and interpreting the same. These bits are set by the copyright holder or an agent of the copyright holder and is sent out into the satellite transmission channel.

FIG. 3 shows that x can be either "0" or "1." The copyright mode bit shows how to interpret the reproduction control state specified by the copyright mode bit and the original/copy bit.

The setting of this copyright mode bit enables to vary the way the reproduction control state is interpreted when the respective bit for copyright and original/copy is "0, 0," in other words when the copyright bit is "0" meaning that the data is protected by copyright, and the original/copy bit is "0" meaning that the data are original, and the way the reproduction control state is interpreted when the respective bit of copyright and original/copy is "0, 1," in other words the copyright bit is "0" meaning that the data is protected by copyright, and the original/copy bit is "1" meaning that the data are a copy from the data on the interface and the data on the medium, and thus establishes two types respectively.

When the copyright mode bit is "0," the copyright bit and the original/copy bit show the reproduction control state of the data on the interface, and when the copyright mode bit is "1," the copyright bit and the original/copy bit show the reproduction control state of the data after they are copied on a medium such as a minidisk. Here, the data on the interface means data being transmitted or data not yet recorded on any recording medium. For example, data on the interface which can be copied for two generations becomes ones that can be copied for a generation only when they are recorded on a recording medium.

The copyright bit shows whether the data is protected by copyright or not. When the copyright bit is "0," the data are protected by copyright, and when the copyright bit is "1," the data are not protected by copyright.

The original/copy bit shows the data generation, in other words whether the data are original or a copy. If the original/copy bit is "0," the data are original, and when the original/copy bit is "1," this shows that the data are a copy.

The MD-EMI selection bit shows what to do with the state of an easily recognizable simplified control information to be stored in the packet header.

This MD-EMI selection bit is effective only when the copyright mode bit, copyright bit and original/copy bits are respectively "0, 0, and 1," in other words when the copyright mode bit is "0," the copyright bit and the original/copy bit show the state of reproduction control of the data on the interface; when the copyright bit is "0," this means that the data are protected by copyright; and if the original/copy bit is "1," this means that the data are a copy.

The MD-EMI selection bit being "0" shows that the reproduction control information to be stored in the packet header will be "11," and the MD-EMI selection bit being "1" shows that the reproduction control information to be stored in the packet header will be "01," The reproduction control information "11" shows originally copy prohibited as described below, and the reproduction control information "01" shows that any further copy is prohibited.

In response to this state of the MD-EMI selection bit, the data transmitting apparatus 10 stores 2-bit information (simplified reproduction control information) in the header of the data packet that carries data.

In other words, upon receiving music data from a satellite, the data transmitting apparatus 10 judges in which state of the five types of reproduction control state (a)~(e) the data are; and stores in the header of the data packet, as easily identifiable reproduction control information, a reproduction control information "00" representing copy free when the reproduction control state is. (a), a reproduction control information "10" representing copy allowed for a limited number of generations when the reproduction control state is (b) or (c), a reproduction control information "01" representing no more copy allowed when the reproduction control state is (d), and a reproduction control information "11" representing originally copy prohibited when the reproduction control state is (e).

And this data transmission system secures a transmission band and stores easily identifiable simplified reproduction control information in the header of an isochronous packet that carries music data by isochronous transfer. For storing area of simplified reproduction control information, according to the IEEE 1394 standard for example, a part of sy field freely available for separate application is used.

Figure 4:
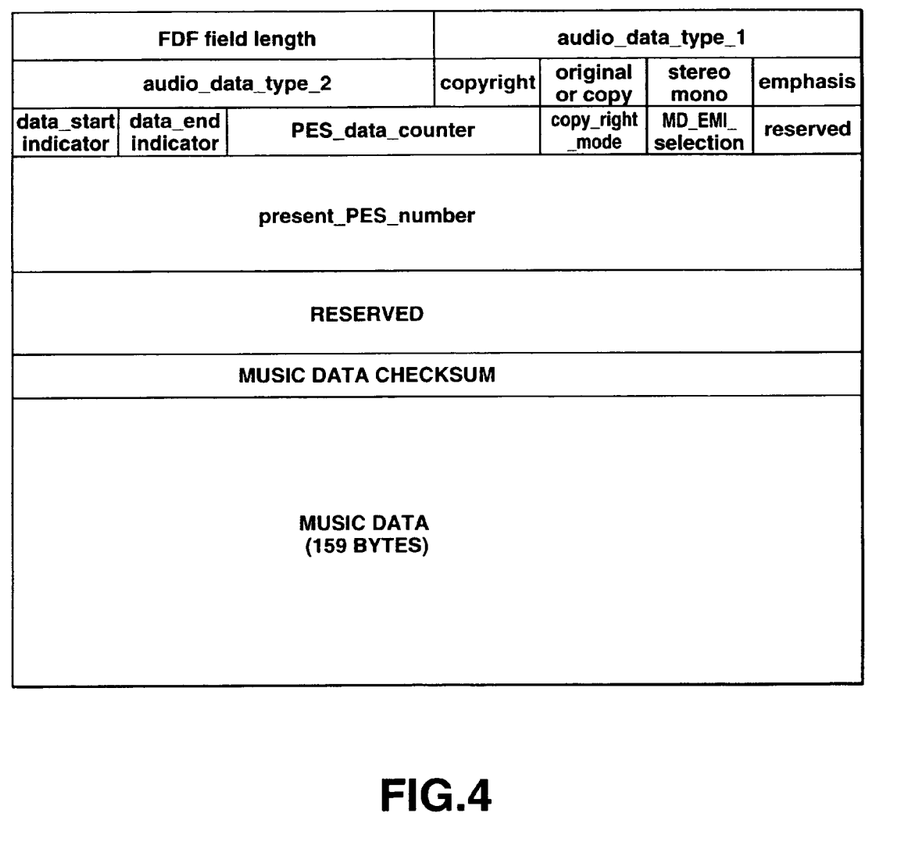
FIG. 4 is a drawing showing the structure of data including the detailed reproduction control information stored in the data field of a data packet.

In addition, the data transmitting apparatus 10 stores during transmission four bits for copyright mode, copyright, original/copy and MD-EMI selection as detailed reproduction control information in the data field as shown in FIG. 4 and transmits the same to the data receiving apparatus 20.

In the data format shown in FIG. 4, the FDF field length field is a field for FDF field length that shows the size of data to be stored in the FDF (Format Dependent Field) where values corresponding to format are recorded. The audio-data-type-1 field and the audio-data-type-2 field are fields showing the type of music data proper to be stored in the data field. The copyright field is a field for storing a copyright bit indicating the presence or absence of copyright. The original/copy field is a field for storing an original/copy bit that shows whether the data are original or not. The stereo mono field is a field for storing a stereo mono bit indicating whether the music data are stereo or mono. The emphasis field is a field for storing an emphasis bit indicating the presence or absence of emphasis. The data-start indicator field is a field for storing a data-start indicator bit showing the starting position of data. The data-end indicator field is a field for storing a data-end indicator indicating the starting position (end?) of data. The PES data counter field is a field for storing a PES-data-counter value showing the value of a PES data counter. The copyright mode field is a field for storing a copyright mode bit showing whether the copyright is the one of the data being transmitted or that of the data recorded in the recording medium. The MD-EMI-selection field is a field for storing a MD-EMI selection bit showing what to do with an easily identifiable reproduction control information to be stored in the packet header. The data-checksum field is a field for storing the data-checksum of music data in the data field. And the data field is a field for storing music data proper.

Figure 5:
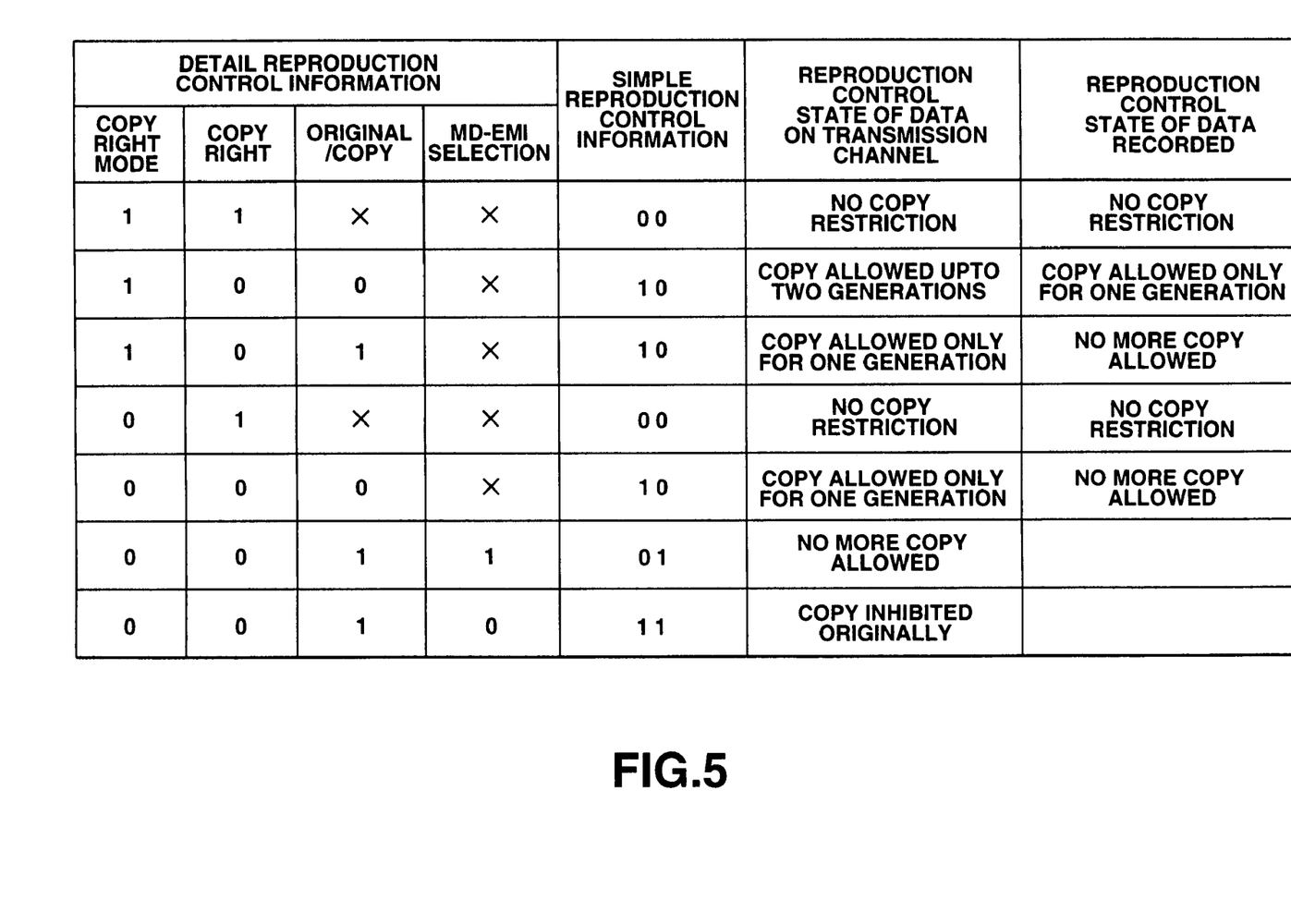
FIG. 5 is a drawing showing the reproduction controlled state of data defined by simplified reproduction control information and detailed reproduction control information contained in a data packet received by the data receiving apparatus side in the data transmission system.

And in this data transmission system, if the data receiving apparatus 20 is an apparatus capable of identifying detailed reproduction control data, on receiving a data packet sent from the data transmitting apparatus 10, the data receiving apparatus 20 interprets the simplified reproduction control information and the detailed reproduction control data as shown in FIG. 5 and processes the data.

In other words, if the simplified reproduction control information of the data packet sent from the data transmitting apparatus 10 is "00," the data receiving apparatus 20 judges that the music data received are data that can be copied without any restriction and can be recorded on the recording media by the action of the media access part 26.

And if the simplified reproduction control information of the data packet that had been sent from the data transmission apparatus 10 is "10," and if the three bits of copyright mode, copyright and original/copy given as the detailed reproduction control information are "1, 0 and 0," the CPU 22 of the data receiving apparatus 20 judges that the music data received are data that can be copied up to the second generation, and can record the same on a recording medium through the media access part 26. While recording the received music data that can be copied up to the second generation on a recording medium through the media access part 26, the CPU 22 of the data receiving apparatus renews the three bits representing the copyright mode, copyright and original/copy forming part of the detailed reproduction control information into "1, 0, 1" or the state of copy allowed only for a generation. In this way, music data that can be copied up to two generations will be reproduced in the form of data that can be copied for only a generation when they are reproduced by the media access part 26 from the recording medium. In this connection, it is also possible to make an arrangement whereby, instead of having the first and detailed reproduction control information stored on the recording medium, another information having the same meaning will be stored there.

And when the simplified reproduction control information of a data packet sent from the data transmitting apparatus 10 is "10" and the three bits for the copyright mode, copyright and original/copy given as detailed reproduction control information are "1, 0 and 1," the CPU 22 of the data receiving apparatus 10 judges the music data received as data that can be copied for a generation, and can record through the action of the media access part 26 on a recording medium. While recording music data received that can be copied for only a generation on a recording medium, the CPU 22 of the data receiving apparatus 20 renews the four bits for copyright mode, copyright, original/copy, and MD-EMI selection constituting detailed reproduction control information into "0, 0, 1, 1," and simplified reproduction control information into "01" meaning no more copy allowed for recording. In this way, music data that can be copied for a generation only will be reproduced as data the further reproduction of which is prohibited when they are reproduced through the media access part 26 from the recording medium. In this connection, it is also possible to make an arrangement whereby, instead of having the first and detailed reproduction control information stored on the recording medium, another information having the same meaning will be stored there.

Furthermore, when the simplified reproduction control information of a data packet sent from the data transmitting apparatus 10 is "01" or "11," the CPU 22 of the data receiving apparatus 10 judges the music data received as data whose copy is prohibited, prohibits the recording of music data through the action of the media access part 26, converts simply the music data into analogue signals and controls the media access part 26 so that the music may be outputted from the voice output terminal 26A.

On the other hand, when the data receiving apparatus 20 that can identify detailed reproduction control information has received a data packet that includes simplified reproduction control information and detailed reproduction control information with a combination other than the ones shown in FIG. 5, the data receiving apparatus 20 judges that the data are illicit and destroys the data. And in FIG. 5, x shows that it can be either "0" or "1."

In addition, in this data transmission system, if the data receiving apparatus 20 is an apparatus that cannot identify detailed reproduction control information, on reception of a data packet sent from the data transmitting apparatus 10, the data receiving apparatus 20 interprets the simplified reproduction control information as shown in FIG. 6 and processes the data accordingly.

In order to enable to interpret the seven types of reproduction control states specified by 4-bit detailed reproduction control information as shown in FIG. 5 as four types of reproduction control states as shown in FIG. 6, the simplified reproduction control information consists of data of such reproduction control state as those on a recording medium that can be copied up to two generations, data on a recording medium that can be copied for only a generation, and data on an interface that can be copied for only a generation defined in common by the simplified reproduction control information "10" as data that can be copied for only a generation, and defined as copy free by the simplified reproduction control information "00," as no more copy allowed by the simplified reproduction control information "01," and originally copy prohibited by the simplified reproduction control information "11."

In this way, if the simplified reproduction control information of a data packet sent from the data transmitting apparatus 10 is "00," the data receiving apparatus 20 judges the music data received as data that can be copied freely and can record the same on a recording medium through the action of the media access part 26.

And if the simplified reproduction control information of the data packet sent from the data transmitting apparatus 10 is "10," the data receiving apparatus 20 judges the music data received as data that can be copied for a generation and can record on a recording medium through the action of the media access part 26. While recording the music data received that can be copied for a generation through the action of the media access part 26, the CPU 22 of the data receiving apparatus 20 renews the simplified reproduction control information to "01" or the state of no more copy allowed. In this way, music data that can be copied for a generation will be recorded on a recording medium through the action of the media access part 26. The music data recorded will be reproduced as data in the state of copy prohibited.

On the other hand, when the data receiving apparatus 20 that cannot identify detailed reproduction control information has recorded the contents on a recording medium according to the above method, the simplified reproduction control information will change from "10" to "01," and will shift to a state of no more copy allowed. No change made in the detailed reproduction control information stored in the data results in differences in information. However, the data receiving apparatus 20 does not record as mentioned above in case the simplified reproduction control information is "01" and therefore there can be no possibility that the contents will be recorded fraudulently.

In addition, when the simplified reproduction control information of the data packet sent from the data transmitting apparatus 10 is "01" or "11," the CPU 22 of the data receiving apparatus 20 judges the music data received as one whose copy is prohibited, prohibits the music data from being recorded by the media access part 26, simply converts the music data into analogue signals and controls the media access part 26 so that the music data may be outputted from the voice output terminal 26A.

Thus, in this data transmission system, on the basis of the detailed reproduction control information defining the reproduction control state of the data to be transmitted, the data transmitting apparatus 10 creates simplified reproduction control information in which the reproduction control state of data is defined more roughly than the detailed simplified reproduction control information, stores the simplified reproduction control information of the data in the packet header of the data packet carrying the data, store the detailed reproduction control information in the data, and transmits the same to the data receiving apparatus 20 through the transmission channel 30 from the input-output interface 16. Thus, it becomes possible to show a variety of reproduction control states that cannot be shown by reproduction control information storable in the packet header alone, and to protect copyright by paying attention to small details. And the data receiving apparatus 20 can proceed to an accurate reproduction control based on the simplified reproduction control information or the detailed reproduction control information or a rough reproduction control based only on the simplified reproduction control information depending on its processing capacity.

While a data transmission system in which a transmission channel is used is described in the above mode of carrying out, it is also possible to apply the system to recording media. For example, in case of application to an optical magnetic disk, simplified reproduction control information is stored in the TOC (table of contents) area where the address information of the data is written, and detailed reproduction control information is buried in the data area along with the data contents. In this way, in a recording apparatus with a high processing capacity, the reproduction control information recorded on a recording medium is used to control reproduction based on simplified reproduction control information and detailed reproduction control information, and in a recording apparatus with a low processing capacity, simplified reproduction control information alone serves as the basis for a reproduction control processing. Such a configuration enables to perform very carefully thought-out reproduction control processing of the contents in a recording apparatus provided with a device of high processing capacity and to create a product that can protect the copyright of the contents even in a recording apparatus provided with a device of a low processing capacity.

The invention claimed is:

1. A data processing apparatus comprising:
storing means for storing data;
generating means for generating a data packet for transmitting the data;
setting means for setting first copy control information indicating copy control information of the data in a header portion of the data packet and second copy control information indicating copy control information of the data, in greater detail than the first copy control information, in a data portion of the data packet, wherein the first copy control information or the second copy control information is used to process the data packet; and
output means for outputting the data packet to another data processing apparatus.

2. A data processing apparatus comprising:
generating means for generating a data packet for transmitting the data;
setting means for setting first copy control information indicating copy control information of the data in a header portion of the data packet and second copy control information indicating copy control information of the data, in greater detail than the first copy control information, in a data portion of the data packet, wherein the first copy control information or the second copy control information is used to process the data packet; and
output means for outputting the data packet including the first copy control information and the second copy control information.

3. A data processing apparatus comprising:
generating means for generating a data packet for transmitting the data;
setting means for setting first copy control information indicating copy control information of the data in a header portion of the data packet and second copy control information indicating copy control information of the data, in greater detail than the first copy control information, in a data portion of the data packet, formed in larger number of bits than the first copy control information, wherein the first copy control information or the second copy control information is used to process the data packet; and
output means for outputting the data packet including the first copy control information and the second copy control information.

4. A data processing apparatus comprising:
generating means for generating a data packet for transmitting the data;
inputting means for the data including first copy control information indicating copy control information of the data in a header portion of the data packet and second copy control information indicating copy control information of the data, in greater detail than the first copy control information, in a data portion of the data packet, wherein the first copy control information or the second copy control information is used to process the data packet when the data is reproduced; and
controlling means for controlling copy control of the data packet based on the first copy control information and the second copy control information.

5. A data processing apparatus comprising:
generating means for generating a data packet for transmitting the data;
inputting means for inputting the data including first copy control information indicating copy control information of the data in a header portion of the data packet and second copy control information indicating copy control information of the data, in greater detail than the first copy control information, in a data portion of the data packet, wherein the first copy control information or the second copy control information is used to process the data packet; and
controlling means for controlling copy control of the data packet to another data processing apparatus when the data is transmitted from outside.

6. A data processing apparatus comprising:
generating means for generating a data packet for transmitting the data;
inputting means for inputting first copy control information indicating copy control information of the data in a header portion of the data packet and second copy control information indicating copy control information of the data, in greater detail than the first copy control information, in a data portion of the data packet, formed in larger number of bits than the first copy control information, wherein the first copy control information or the second copy control information is used to process the data packet; and
controlling means for controlling copying of the data packet based, on the first copy control information and the second copy control information.

7. A data processing method comprising:
storing data in a storage;
generating a data packet for transmitting the data;
setting first copy control information indicating copy control information of the data in a header portion of the data packet and second copy control information indicating copy control information of the data, in greater detail than the first copy control information, in a data portion of the data packet, wherein the first copy control information or the second copy control information is used to process the data packet; and
outputting the data packet to another data processing apparatus.

8. A data processing method comprising:
generating a data packet for transmitting the data;
setting first copy control information indicating copy control information of the data in a header portion of the data packet and second copy control information indicating copy control information of the data, in greater detail than the first copy control information, in a data portion of the data packet, wherein the first copy control information or the second copy control information is used to process the data packet; and
outputting the data packet including the first copy control information and the second copy control information.

9. A data processing method comprising:
generating a data packet for transmitting the data;
setting first copy control information indicating copy control information of the data in a header portion of the data packet and second copy control information indicating copy control information of the data, in greater detail than the first copy control information, in a data portion of the data packet, formed in larger number of bits than the first copy control information, wherein the first copy control information or the second copy control information is used to process the data packet; and
outputting the data packet including the first copy control information and the second copy control information.

10. A data processing method comprising:
generating a data packet for transmitting the data;
inputting data including first copy control information indicating copy control information of the data in a header portion of the data packet and second copy control information indicating copy control information of the data, in greater detail than the first copy control information, in a data portion of the data packet, wherein the first copy control information or the second copy control information is used to process the data packet when the data is reproduced; and
controlling copy control of the data packet based on the first copy control information and the second copy control information.

11. A data processing method comprising:
generating a data packet for transmitting the data;
inputting data including first copy control information indicating copy control information of the data in a header portion of the data packet and second copy control information indicating copy control information of the data, in greater detail than the first copy control information, in a data portion of the data packet, wherein the first copy control information or the second copy control information is used to process the data packet; and
controlling copy control of the data packet to another data processing apparatus when the data is transmitted from outside.

12. A data processing method comprising:
generating a data packet for transmitting the data;
inputting first copy control information indicating copy control information of the data in a header portion of the data packet and second copy control information indicating copy control information of the data, in greater detail than the first copy control information, in a data portion of the data packet, formed in larger number of bits than the first copy control information, wherein the first copy control information or the second copy control information is used to process the data packet; and
controlling copy of the data packet based on the first copy control information and the second copy control information.

* * * * *